United States Patent [19]

Williams et al.

[11] 4,047,732
[45] Sept. 13, 1977

[54] CAMBERING VEHICLE WITH HYDRAULIC STABILIZER AND EQUALIZER

[75] Inventors: Jerry K. Williams, Sterling Heights; Franklin D. Landmesser, Troy, both of Mich.

[73] Assignee: General Motors Corporation, Detroit, Mich.

[21] Appl. No.: 744,968

[22] Filed: Nov. 26, 1976

[51] Int. Cl.² .................................................. B60G 19/06
[52] U.S. Cl. .............................. 280/287; 280/112 A; 280/220
[58] Field of Search ...................... 280/287, 278, 87 R, 280/87.04 R, 87.04 A, 87.1, 6.11, 21 R, 21 A, 14, 15, 16, 17, 12.1, 12 H, 111, 112 R, 112 A, 11.3, 282, 283, 200, 210, 218, 220, 221, 224, 233

[56] References Cited

U.S. PATENT DOCUMENTS

| | | | |
|---|---|---|---|
| 2,593,974 | 4/1952 | Brown | 280/21 R |
| 3,033,585 | 11/1962 | Marston et al. | 280/16 X |
| 3,229,782 | 1/1966 | Hilton | 280/287 X |
| 3,354,975 | 11/1967 | Stuart | 280/278 X |
| 3,540,750 | 11/1970 | Berger | 280/16 |
| 3,964,563 | 6/1976 | Allen | 180/41 X |

FOREIGN PATENT DOCUMENTS

| 4,942,586 | 4/1974 | Japan | 280/112 A |
|---|---|---|---|

Primary Examiner—Philip Goodman
Assistant Examiner—Jack D. Rubenstein
Attorney, Agent, or Firm—Charles R. White

[57] ABSTRACT

An articulated cambering vehicle in which a pair of trailing arms are interconnected to each other and to a front steering frame by a hydraulic stabilizer and equalizer providing: stabilization of the steering frame, the equal and opposite movement of the arms during cambering operation, the hydraulic locking of the trailing arms to the front steering frame for vehicle parking, and the folding and locking of the front steering frame intermediate the trailing arms for vehicle stowage purposes.

2 Claims, 5 Drawing Figures

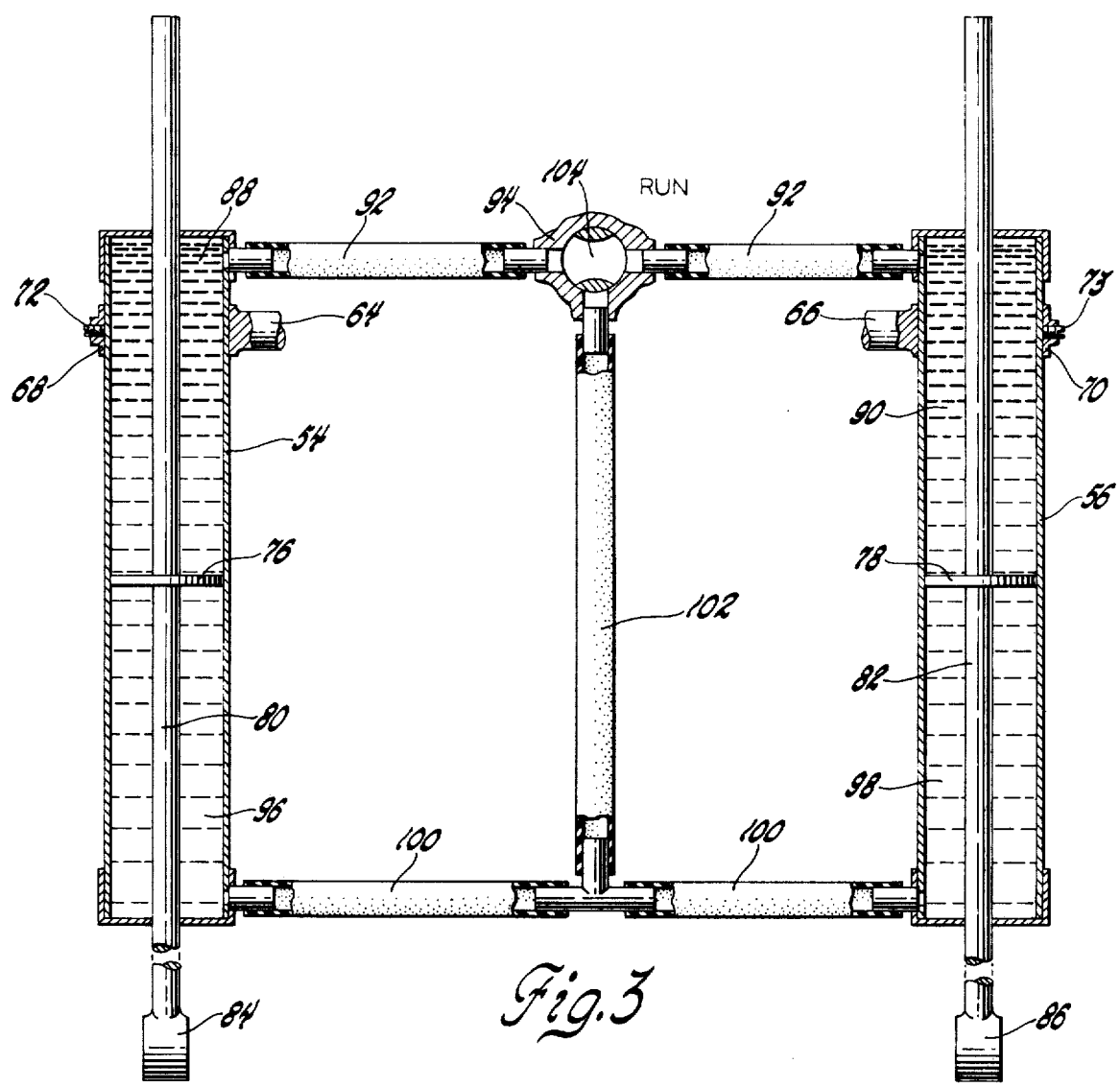
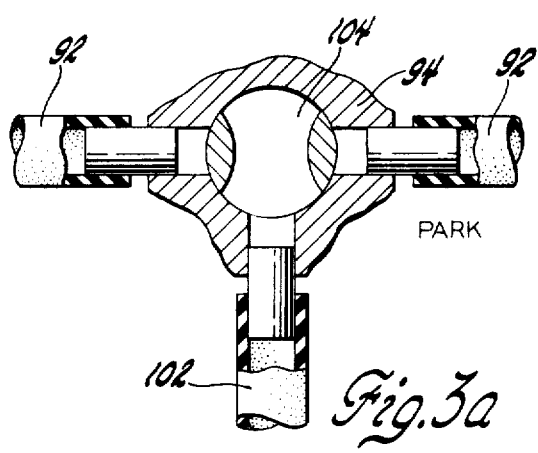 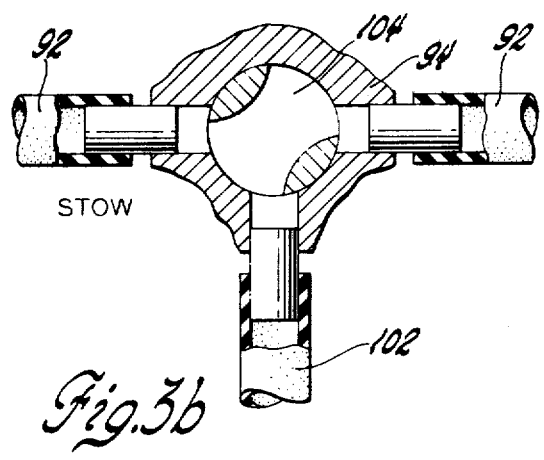

CAMBERING VEHICLE WITH HYDRAULIC STABILIZER AND EQUALIZER

This invention relates to a cambering vehicle having a pair of trailing arms operatively connected to a front steering frame for up and down swinging movement and interconnected to each other and to the frame by a hydraulic stabilizer and equalizer mechanism which provides for the equalized camber of the vehicle ground contacts while supporting the steering frame and which further provides for upright vehicle parking on level and inclined surfaces and for vehicle stowage in a compact and rigid collapsed position.

Copending patent application Ser. No. 713,411 entitled "Cambering Vehicle" filed Aug. 11, 1976 and assigned to the assignee of this invention concerns a cambering vehicle having a pair of trailing arms pivoted to a front steering frame interconnected by a mechanical stabilizer system which supports the front steering frame and which provides for the equal and opposite movement of the arms during cambering operation. The stabilizer system further permits the arms to be locked relative to each other and to the steering frame to provide for stabilized parking of the vehicle in a standing position. Also the steering frame may be moved to a folded position between the trailing arms and subsequently locked in that position. In this manner the vehicle is readily collapsible into a low profile configuration and into a rigid package that can be manually handled and placed in a relatively small compartment such as the trunk of an automobile. Two forms of mechanical stabilizer systems are disclosed by the above-noted patent application with one employing cables and the other having link members for interconnecting the trailing arms and equalizing the relative movement of the trailing arms as the vehicle negotiates a cambered turn.

This invention is drawn to a cambering vehicle of the above-described type that supports an operator in a standing position on the trailing arms as he steers the vehicle through a front steering frame which incorporates a new and improved stabilizer and equalizer system for running, parking and stowage. This invention more particularly concerns a new and improved hydraulic stabilizer and equalizer for the articulated trailing arms and steering frame of cambering vehicles that incorporates a pair of spaced hydraulic cylinders having separate piston rod means, each attached to one of the trailing arms. The cylinders are supported on a front steering frame and are operatively connected to each other by a hydraulic control system that incorporates a special value mechanism manually positionable to hydraulically interconnect the two cylinders and provide for equal and opposite movement of the interconnected arms, to further provide for the hydraulic locking of the system so that the vehicle can be parked in an upright position on a level or inclined surface and furthermore to interconnect the cylinders so that the steering frame can be folded to a position intermediate the trailing arms and subsequently hydraulically locked so that the vehicle can be manually handled in a compact position for stowage or for carrying purposes.

More specifically, the hydraulic equalizer of this cambering vehicle incorporates a new and improved hydraulic control system interconnecting left and right side trailing arms of an articulated frame, light weight cambering vehicle in which the front steering shaft and the two railing arms are hydraulically interconnected to one another to maintain the steering column at a predetermined angle with respect to a support surface. This system interconnects the trailing arms so that they move in equal and opposite directions in response to left and right cambering modes of operation.

These and other objects, features and advantages of this invention will be more apparent from the following detailed description and drawings in which:

FIG. 3 is a schematic diagram illustrating the hydraulic stabilizer and equalizer according to this invention, and FIGS. 3a and 3b are portions of the schematic diagram of FIG. 3 illustrating the valve mechanism in adjusted position for vehicle parking and stowage.

Figure 1:
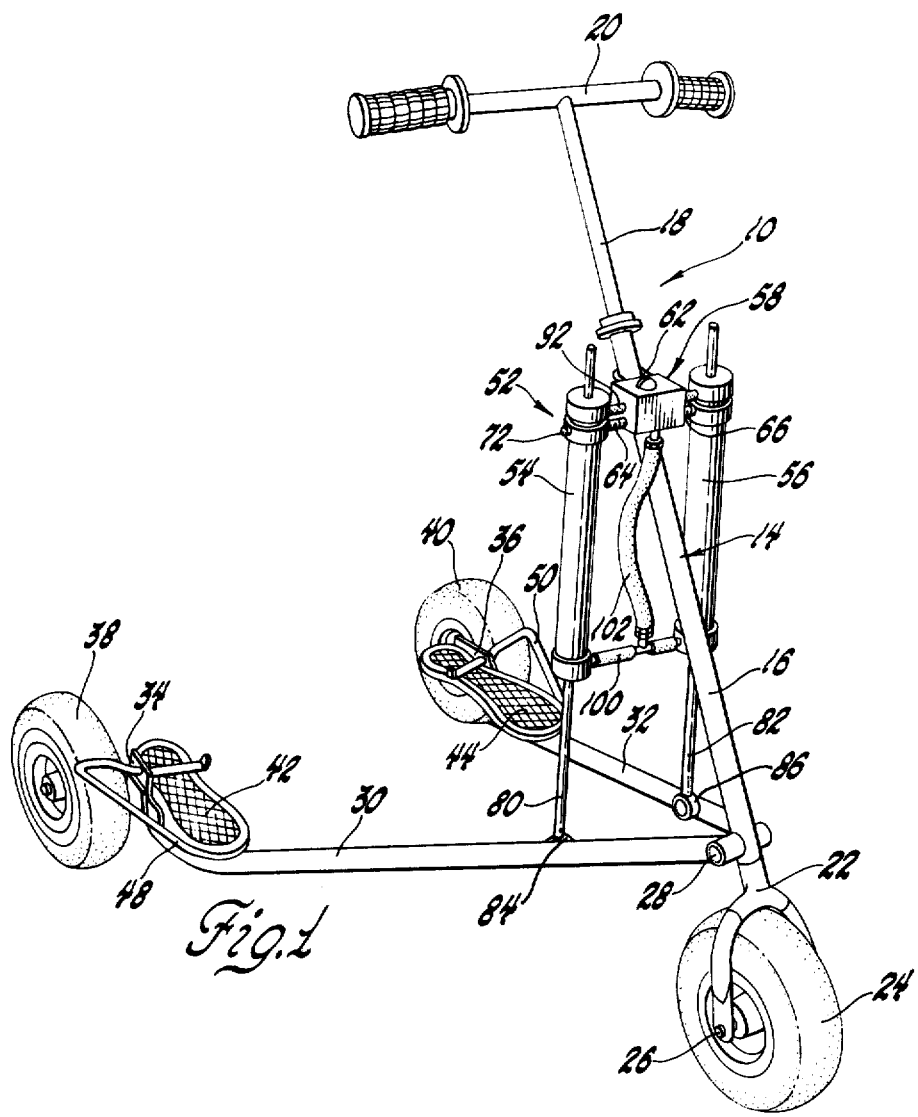
FIG. 1 is a perspective view showing the cambering vehicle incorporaing the hydraulic equalizer mechanism made in accordance with this invention.

Referring to FIG. 1 of the drawing, a cambering vehicle 10 is shown which is adapted to be manually propelled forwardly by the input of a standing vehicle operator through the timed shifting of his weight from one foot to the other coordinated with the left and right steering of the vehicle in a sinuous path. A vehicle of this type is disclosed in copending patent application Ser. No. 649,967, filed Jan. 19, 1976, entitled "Cambering Vehicle" and the disclosure of this copending application is hereby incorporated by reference into this application for details of this method of operation.

It will be appreciated that although a manually propelled vehicle is shown in the drawing, an internal combustion engine or an electric motor can be combined with the vehicle for driving the front wheel thereof to provide a powered version of the vehicle.

The cambering vehicle 10 comprises a front steering frame 14 that includes the tubular column 16 which serves to axially align and rotatably support an elongated steering shaft 18 that extends therethrough. The upper end of the steering shaft is provided with a handlebar assembly 20 while the lower end is connected to a fork 22 that rotatably supports the front wheel 24 of the vehicle. The front wheel 24 rotates on an axle 26 which extends transversely through and which is supported by fork 22. The lower end of the tubular column 16 has a transverse shaft 28, the outer ends of which pivotally support the front ends of a pair of laterally spaced and rearwardly extending trailing arms 30 and 32. As shown in FIG. 1 brackets 34 and 36 are supported on the free ends of the trailing arm.

Rear wheels 38 and 40 are respectively supported for rotation on axles carried by the brackets 34 and 36. These brackets also pivotally support right and left foot pads 42 and 44 on which an operator may stand while operating the vehicle. The foot pads may be rocked by the footwork of the standing operator between a forward, vehicle operating position and a rearward, vehicle braking position in which braking arms 48 and 50 carried by foot pads 42 and 44 respectively frictionally engage the rear wheels 38 and 40.

A hydraulic equalizer and stabilizer control system 52 for the vehicle is provided to interconnect the trailing arms 30 and 32 to each other and to steering frame 14 to (1) maintain steering frame 14 at a predetermined rake agle relative to the vehicle support surface; (2) provide a mechanism to interconnect the trailing arms so that they move in an equal and opposite direction when the vehicle is cambered; (3) provide a hydraulic lock so that the trailing arm and steering frame can be locked together in any relative position for vehicle parking in a standing position, and (4) provide a mechanism to permit the steering frame to be moved to a folded position intermediate the laterally spaced trailing arms and be subsequently hydraulically locked to the trailing arms so that a rigid compact package is provided for storage or manual handling purposes.

Figure 2:
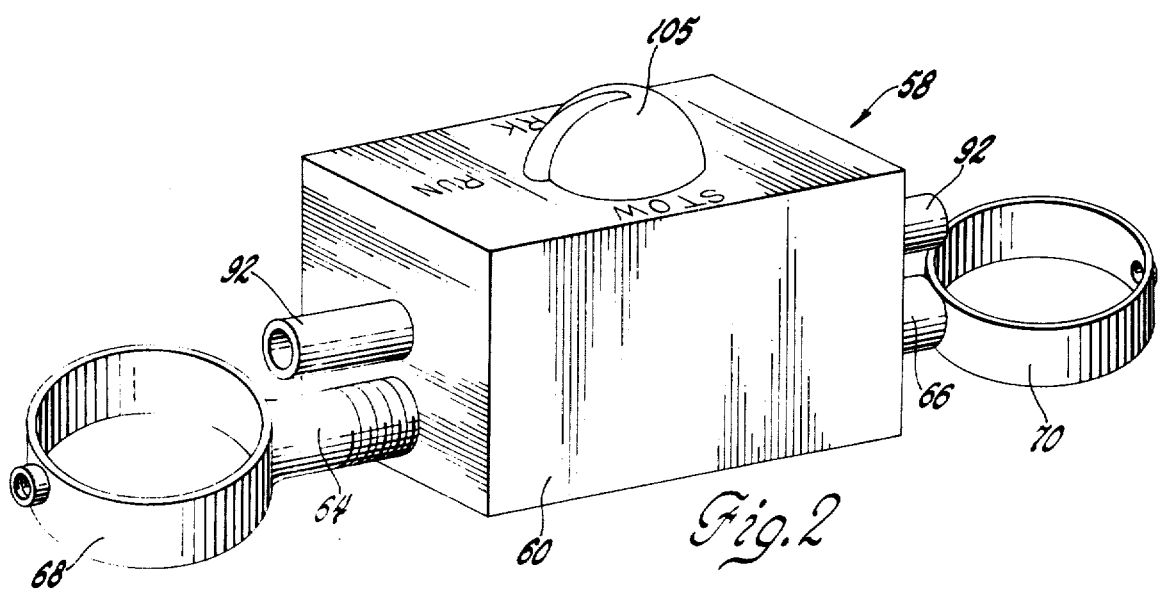
FIG. 2 is an enlarged view of a portion of the control used with this invention.

The hydraulic system 52 includes a pair of hydraulic cylinders 54 and 56 that are secured to the steering frame 14 by an upper valve assembly 58. As best shown in FIG. 2, valve assembly 58 comprises a valve body 60 that is fastened by a suitable clamp 62 to the steering frame 14. Laterally extending threaded connector means 64 and 66 extend from the right and left sides of the valve body 60 and terminate in circular end portions 68 and 70 through which the cylinders 54 and 56 respectively extend. Set screws 72 and 73 are threaded into the circling end portions to hold the cylinders in a selected position with respect to the steering column. The threaded connection of the threaded connectors 64 and 66 with the valve body provide a pivot connection between the cylinders and the steering frame to permit the steering frame to be moved to the stowed position which will become more apparent from the description below.

Each of the cylinders 54 and 56 contains a piston 76 and 78 mounted for reciprocal motion in its respective cylinder. Piston rods 80 and 82 extend from pistons 76 and 78 respectively through the cylinders and have their lower ends journalled to right and left side pivots 84 and 86 extending laterally from trailing arms 30 and 32 adjacent to the front ends thereof.

Turning now to FIG. 3 in greater detail, the cylinders 54 and 56 are filled with a suitable oil or other hydraulic fluid and have upper chambers 88 and 90 that are hydraulically interconnected to each other by an upper line 92 having control valve 94 hydraulically connected therein. Lower chambers 96 and 98 of cylinders 54 and 56 are interconnected by a lower line 100 that in turn is hydraulically connected by centralized line 102 to control valve 94 of the upper line. The valve 94 has a valve element 104 with control knob 105 manually movable by the vehicle operator to condition the vehicle for run, park and stow.

In the run position shown in FIG. 3 the valve element 104 is turned by the vehicle operator to hydraulically interconnect the upper chambers with each other while blocking the centralized line 102. Under these conditions and assuming the operator is cambering the vehicle to one side or the other the control system will effect the equal and opposite movement of the trailing arms. For example, assuming the vehicle was being cambered to the right, piston 76 will be formed upwardly and piston 78 downwardly by the right and left trailing arms. Fluid from right side contracting upper chamber 88 is forced into expanding left side upper chamber 90 while fluid from the left side contracting lower chamber 98 is forced by the piston 78 into the right side expanding lower chamber 96. By this means it will be appreciated that the arms can move only in equal and opposite directions. Assuming that the vehicle is to be parked in a standing position the valve element 104 can be moved by manual knob 105 to the FIG. 3a position. Under these conditions the line 92 will be blocked by the valve element 104 so that the upper chambers cannot communicate with one another or with the lower chambers. Under these conditions, the cylinders are hydraulically locked so that the trailing arms and the steering frame are fixed in adjusted position. It will be appreciated that the trailing arms 30 and 32 can be angularly adjusted and locked for hillside parking or loaded in the same plane for parking on a level surface. For stowage, the valve element is moved to the FIG. 3b position so that lines 92, 100 and 102 and all chambers are interconnected with one another. Under these conditions the steering frame can be moved to the stow position between the trailing arms. The valve element 104 is subsequently moved to the park position of FIG. 3a to hydraulically lock the vehicle in the compact and low profile position.

While the invention has been described in connection with a preferred specific embodiment thereof, it will be appreciated that various modifications of this construction can be made in light of this description and without departing from the spirit of the disclosure or the scope of the following claims:

What is claimed is:

1. A cambering vehicle comprising a main steering frame, right and left trailing arms extending rearwardly from said main frame, forward pivot connection means pivotally connecting one end of each of said arms to said main steering frame so that said trailing arms may swing on said forward pivot connection means, an equalizer and stabilizer system interconnecting said trailing arms and said main steering frame to normally support said main steering frame at a predetermined rake angle with respect to a support surface and to provide for the equal and opposite movement of said trailing arms under predetermined vehicle operating conditions, front contact means steerably mounted to said main steering frame, manual steering means connected to said front contact means, and a rear contact means for each of said trailing arms mounted at the rearward portions thereof, foot rest means on each of said trailing arms to receive the feet of a vehicle operator so that an operator can stand on the vehicle and naturally camber the vehicle while the vehicle is moving, said equalizer and stabilizer system comprising left and right hydraulic cylinders, connector means connecting each of said cylinders to said main frame, a piston and piston rod assembly operatively mounted in each of said cylinders, said piston rods extending generally downwardly from said respective cylinders, pivot means connecting each said piston rod to a respective trailing arm, a hydraulic control for said cylinders comprising hydraulic fluid passage means interconnecting said cylinders so that said trailing arms are forced by the hydraulic fluid in said system to move in equal and opposite directions when said vehicle is cambered, and valve means hydraulically connected in said fluid passage means to condition said system for a hydraulic lock condition and to thereby hold said trailing arms and said main steering frame stationary for vehicle parking, and further to selectively hydraulically interconnect said cylinders so that said trailing arms can be moved to a folded position with respect to said main frame and subsequently be hydraulically locked for vehicle stowage.

2. A cambering vehicle comprising a main steering frame, right and left trailing arms extending rearwardly from said main frame, forward pivot connection means pivotally connecting the forward end of each of said arms to said main steering frame so that said trailing arms may swing upwardly and downwardly, a stabilizer system interconnecting said trailing arms and said main steering frame to normally support said main steering frame at a predetermined rake angle with respect to a support surface and to provide for the equal and opposite movement of said trailing arms under predetermined vehicle operating conditions, front wheel means steerably mounted to said main steering frame, manual steering means connected to said front wheel means, and rear wheel means for each of said trailing arms mounted at the rearward portions thereof, foot rest means on each of said trailing arms to receive the feet of a vehicle operator so that an operator can stand on the vehicle and naturally camber the vehicle while the vehicle is moving, said stabilizer system comprising left and right hydraulic cylinders, connector means connecting each of said cylinders to said main frame, a piston and piston rod assembly operatively mounted in each of said cylinders, said pistons of said assembly dividing each of said cylinders into upper and lower chambers, said piston rods extending generally downwardly through said respective cylinders, pivot means connecting each said piston rod to a respective trailing arm, hydraulic control means for said cylinders comprising first fluid passage means interconnecting said upper chambers, second fluid passage means interconnecting said lower chambers and intermediate passage means interconnecting said first and second passage means, valve means operatively connected in said control and movable to a first position to hydraulically connect said upper chambers to each other and block said intermediate passage means and further to hydraulically connect said lower chambers to each other so that said trailing arms are forced by hydraulic fluid acting on said piston assemblies to move in equal and opposite directions when said vehicle is cambered, said valve being movable to a second position to hydraulically lock said cylinders to each other to thereby hold said trailing arms and said main steering frame stationary with respect to one another for vehicle parking, and being further movable to a third position to selectively hydraulically interconnect said cylinders so that said trailing arms can be moved to a folded position with respect to said main frame and be subsequently hydraulically locked in the folded position for vehicle stowage.

* * * * *